(12) United States Patent
Sanders

(10) Patent No.: US 7,184,144 B2
(45) Date of Patent: Feb. 27, 2007

(54) HIGH SPEED SWEPT FREQUENCY SPECTROSCOPIC SYSTEM

(75) Inventor: Scott T. Sanders, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 231 days.

(21) Appl. No.: 10/637,472

(22) Filed: Aug. 8, 2003

(65) Prior Publication Data

US 2004/0031923 A1 Feb. 19, 2004

Related U.S. Application Data

(60) Provisional application No. 60/402,492, filed on Aug. 8, 2002.

(51) Int. Cl.
*G01J 3/28* (2006.01)

(52) U.S. Cl. .......................................... 356/326; 372/21
(58) Field of Classification Search ................ 356/326; 372/21
See application file for complete search history.

(56) References Cited

U.S. PATENT DOCUMENTS 5,144,374 A * 9/1992 Grego ..................... 356/326

2002/0067747 A1 * 6/2002 Jalali et al. ..................... 372/9

OTHER PUBLICATIONS

Tong, Y.C., Chan, L.Y., Tsang, H.K., Fiber Dispersion of Pulse Spectrum Measurement Using a Sampling Oscilloscope, Elect. Lett. 33, 983, (1997).
Whitten, William B., Time of Flight Optical Spectrometry with Fiber Optic Waveguides, Anal. Chem. 1982, 54, 1026-1028.
Nishizawa, Norihiko, Goto, Toshio, Widely Broadened Super Continuum Generation Using Highly Nonlinear Dispersion Shifted Fibers and Femtosecond Fiber Laser, Jpn. J. Appl. Phys. vol. 40 (2001) pp. L365-L367, Part 2, No. 4B, Apr. 15, 2001.
P.V. Kelkar, et al., Time-domain optical sensing, Electonic Letters, Sep. 16, 1999, vol. 35, No. 19, pp. 1661-1662.

* cited by examiner

*Primary Examiner*—Gregory J. Toatley, Jr.
*Assistant Examiner*—Kara Geisel
(74) *Attorney, Agent, or Firm*—Boyle Fredrickson Newholm Stein & Gratz S.C.

(57) ABSTRACT

A high scan rate spectroscopic system converts a narrowband laser pulse into a multispectral pulse, using, for example, a nonlinear fiber. The multispectral pulse is then converted to a swept frequency pulse through a second fiber impressing a frequency-dependent delay in the light beam which is then applied to the object to be tested.

17 Claims, 2 Drawing Sheets

HIGH SPEED SWEPT FREQUENCY SPECTROSCOPIC SYSTEM

CROSS REFERENCE TO RELATED APPLICATIONS

This application is based on provisional application 60/402,492 filed Aug. 8, 2002 and entitled "High Speed Swept Frequency Spectroscopic System" and claims the benefit thereof.

STATEMENT REGARDING FEDERALLY SPONSORED RESEARCH OR DEVELOPMENT

BACKGROUND OF THE INVENTION

The present invention relates to spectroscopy systems and in particular to a high-speed spectroscopy system suitable for analyzing highly dynamic systems.

Spectroscopy studies the interaction between a material or materials and different frequencies of light to characterizes the spectral response of materials, such as gases, liquids, aerosols, solids, particulates, fiber-optic components etc. as may be related to physical properties of the material under test (e.g., temperature, pressure, velocity, composition, size, stress/strain. The interaction studied can be absorption, or reflectivity, scattering, fluorescence, etc.

The material being studied by spectroscopy may alternatively be a sensor constructed to modify particular light frequencies based on a measured parameter. One type of sensor is a fiber-Bragg grating (FBG) in which a fiber optic is treated to reflect a single frequency of light passing along its length. The reflected frequency is a function of a periodic variation in the fiber's index of refraction impressed on the length of the fiber. Physical changes in the fiber, such as caused by strain or thermal expansion, change the frequency of this reflected light allowing indirect measurements of temperature and strain.

High speed spectroscopy may be performed by applying a multispectral pulse to the material being studied then collecting the light modified by the material with a fiber optic which provides a variable delay in frequencies of the light pulse proportional to light frequencies. Spectroscopic analysis can then be performed by detecting the change in intensity of the light as a function of time and relating the time scale to frequency. Such a system is described in "Time of Flight Optical Spectrometry with Fiber Optic Wave Guides" by William Whitten published in Analytical Chemistry, Volume 54, Number 7, June 1982. In this device, a narrow band laser illuminates a chamber containing $CCl_4$ to create the multispectral pulse, which is then used to illuminate a test cell.

The CCl4 chamber is cumbersome and causes a loss of coherence in the light signal from the laser. Coupling the light from the test cell to the fiber is difficult.

BRIEF SUMMARY OF THE INVENTION

The present invention provides an improved spectroscopy system in which a short multi-frequency pulse is received directly by a fiber optic cable to spread the frequency in time prior to its being transmitted into a test cell. This approach significantly reduces the losses in coupling light to the optic fiber and avoids the measurement of unwanted nonlinear processes as might occur under simultaneous excitation of the test material with multiple frequencies of light.

In a preferred embodiment, the multifrequency light source is created by a laser pulse transmitted through a non-linear fiber to broaden its spectrum. The laser, non-linear fiber, and frequency spreading fiber may be easily joined with minimal coupling losses to produce a robust light source.

Specifically then, the present invention provides a spectroscopy system having a light source producing a multifrequency pulse of light followed by a frequency dependant fiber optic cable receiving the multi-frequency light pulse to produce a frequency varying light signal. A test station holding a material to be tested is positioned to receive the frequency varying light signal from the fiber optic cable and a detector receives light from the test station to characterize the light intensity as a function of time.

Thus, it is one object of the invention to provide an improved spectroscopic system with superior light coupling.

The light retarder may be a length of optical cable providing increased delay in higher frequencies of the light pulse.

Thus, it is another object of the invention to provide a system having optical components that are simply joined with reduced light loss.

The light source may be light source a laser providing a narrow frequency pulse to a non-linear optical cable.

Thus, it is another object of one embodiment of the invention to provide a simple wavelength agile light source for spectroscopy.

Alternatively, the light retarder may be a length of standard fiber optic cable or cable of the type used to compensate for frequency spreading in standard communication fibers.

It is another object of the invention to reduce fiber length and loss by using compensation fiber intended to compensate for spectral shifting in conventional communication optical fibers.

The light retarder might be a combination of at least two consecutive lengths of fiber optic cable, a first providing increased delay in lower frequencies of the light pulse, and a second providing increased delay in higher frequencies of the light pulse.

It is thus another object of the invention to provide a method of adjusting the linearity of frequency sweep through the selection of different cable types and lengths.

The system may include a spectral filter receiving the frequency-varying light signal to selectively pass only a range of frequencies of the frequency-varying light signal.

Thus, it is another object of the invention to provide a versatile system that may be easily adjusted to scan through different subsets of a larger range.

The system may include a test element receiving the frequency-varying light signal and a sensor providing an amplitude measurement of the frequency-varying light signal after passing through the test element.

Thus it is another object of the invention to provide a system for absorption spectrometry.

Alternatively, the test element may be a sensor modifying frequencies of the frequency-varying light signal according to a sensor parameter being measured.

Thus it is another object of the invention to provide a light source suitable for use in interrogating sensors having predefined optical characteristics.

The invention enables a method of monitoring a structure, comprising the steps of attaching to the structure a plurality of light transducers, each monitoring a physical parameter and modulating received light by absorption of at least one frequency of light according to the parameter being monitored, wherein each light transducer has a different absorption frequency. The light transducers are illuminated with multiple frequencies of light, and absorption is monitored from light reflected from the structure and the light transducers to detect frequencies of absorption.

Thus it is another object of the invention to provide for noncontact sensing of multiple sensors, each keyed to a particular frequency in a swept frequency range, thus providing an effective frequency multiplexing of these sensors.

These particular objects and advantages may apply to only some embodiments falling within the claims and thus do not define the scope of the invention.

DETAILED DESCRIPTION OF THE PREFERRED EMBODIMENT

Figure 1:
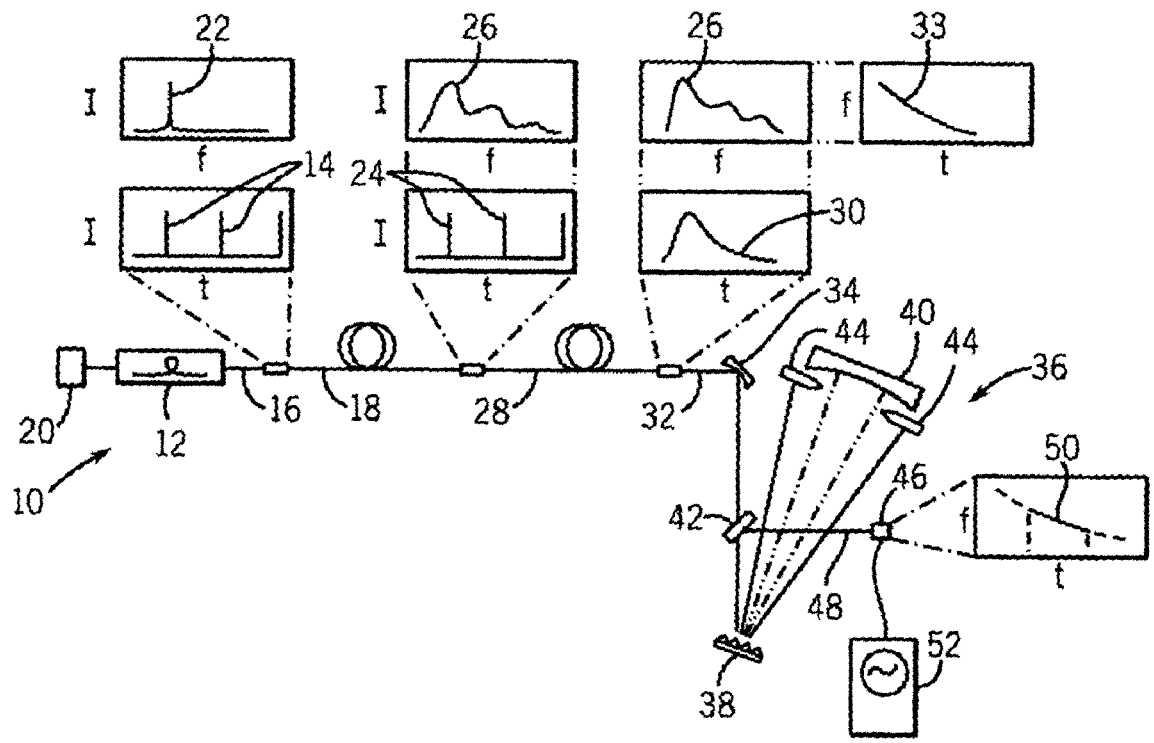
FIG. 1 is a simplified block diagram of the optical path of the present invention, showing time domain and frequency domain plots of a light pulse as it passes along the path.
Figure 2:
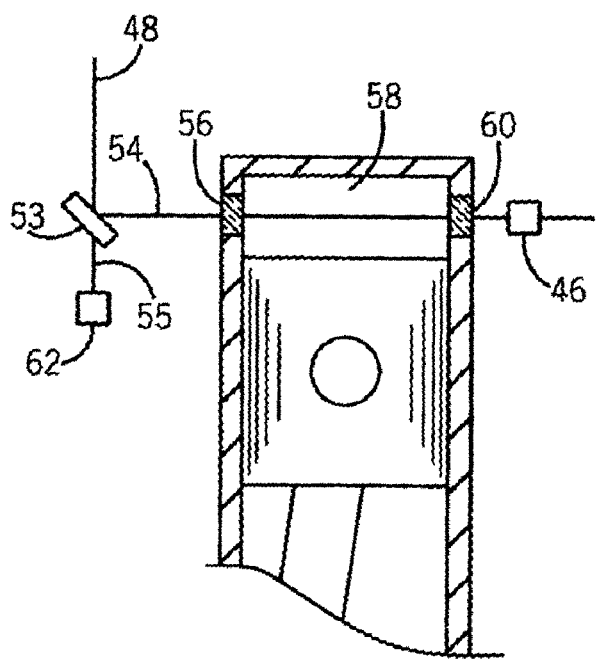
FIG. 2 is a simplified representation an upper portion of a combustion chamber of a reciprocating engine, such as may provide a test chamber for absorption spectrometry using the present invention.

Referring now to FIG. 1, the agile laser 10 of the present invention employs a fiber laser 12 such as a passively mode-locked Er-doped fiber laser such as is sold by IMRA under the trade name Femtolite, commercially available from IMRA of Ann Arbor, Mich.

In the preferred embodiment, the fiber laser 12 is controlled by associated trigger electronics 20 to produce a three-hundred femtosecond pulse of 1.56-micrometer light at a repetition rate of forty-eight MHz. Each of these short pulses 14 has a narrow frequency bandwidth 22 (spectra), being substantially 0.02 micrometers in frequency width. The average power of the pulses 14 is sixty milliwatts with a peak power of five kilowatts.

The short pulses 14 are communicated through a fiber coupler 16 of the fiber laser 12 to a nonlinear fiber 18. The nonlinear fiber 18 may be two-hundred meters of PM-HN-DSF fiber available from Sumimoto Electric Industries of Osaka, Japan. Nonlinear processes such as self-phase modulation, four-photon mixing, and stimulated Raman scattering act in concert to expand the spectrum 22 of pulse 14 to a broader spectrum 26 encompassing a wavelength range of 1.2 to 2.2 micrometers. After the pulses 14 pass through the nonlinear fiber 18, they nevertheless retain their time domain characteristic as pulses 24, although attenuation in the nonlinear fiber 18 and its coupling reduce the power to thirty milliwatts.

Alternatively, the fiber laser 12 and non-linear fiber may be replaced with a pulsed LED producing a multispectral pulse or a wide spectrum laser.

The pulses 24 are received by a standard dispersion-shifted fiber optic cable 28. Fiber optic cable 28 is commercially available from the Corning Company of Corning, N.Y., under the trade name of MetroCor and may be 5.55 kilometers in length. The fiber optic cable 28 increases the delay of the blue end of the spectra of frequencies making up pulses 24, causing a spreading of the pulses 24 into pulses 30 being approximately twenty nanoseconds long and having a center frequency that increases monotonically over time as indicated by frequency scan 33. The pulses 30 exit the fiber optic cable as collimated beam 32.

Alternatively, a dispersion-compensating fiber may be used for the fiber optic cable 28 in which greater dispersion is obtained at similar attenuation. Such dispersion-compensating fiber is used to correct for frequency spreading of standard fiber optic cables used for communications and the like and provide increased delay to the red end of the spectrum to produce a signal with a monotonically decreasing center frequency with time.

A combination of dispersion compensating and standard fibers may also be used for fiber optic cable 28 to achieve linear scans when necessary or otherwise control the time function of the frequency sweep to a desirable curve.

The fiber optic cable 28 may be adjusted in length to control the scan rate and effectively the line width (frequency span) of the collimated beam 32 on an instantaneous basis, this being the product of the scan rate and the laser pulse duration. Using this technique, a signal with an effective line width of 500 MHz can be scanned from 1350 to 1550 nm every 20 ns.

The collimated beam 32 output from fiber optic cable 28 is received by an off-axis parabolic mirror 34 and directed to a tunable band pass filter 36 comprised of a diffraction grating 38 and parabolic mirror 40. After reflection off the parabolic mirror 34, the collimated beam 32 passes through a beam-splitter 42 to strike grating 38 and to be broken spatially into its constituent frequencies as it is reflected to the surface of parabolic mirror 40. One or more knife edges 44 positioned at the surface of the parabolic mirror 40 may be used to control the upper and lower range of frequencies present in the collimated beam 32, which then is reflected back from parabolic mirror 40 to grating 38.

The grating 38 effects a second diffraction that recreates the collimated beam 32 and directs it back to the beam-splitter 42 that sends it ultimately to a sensor 46 as a collimated, truncated, frequency-swept beam 48, having band-limited spectral characteristics 50. The sensor 46 may be a balanced 1-gigahertz bandwidth InGaAs detector sampled at twenty giga samples per second.

The signal from the sensor 46 may be received by processing electronics 52, which may calculate absorption $(-\ln(I/I_0))$ of the collimated, truncated, frequency-swept beam 48.

Figure 3:
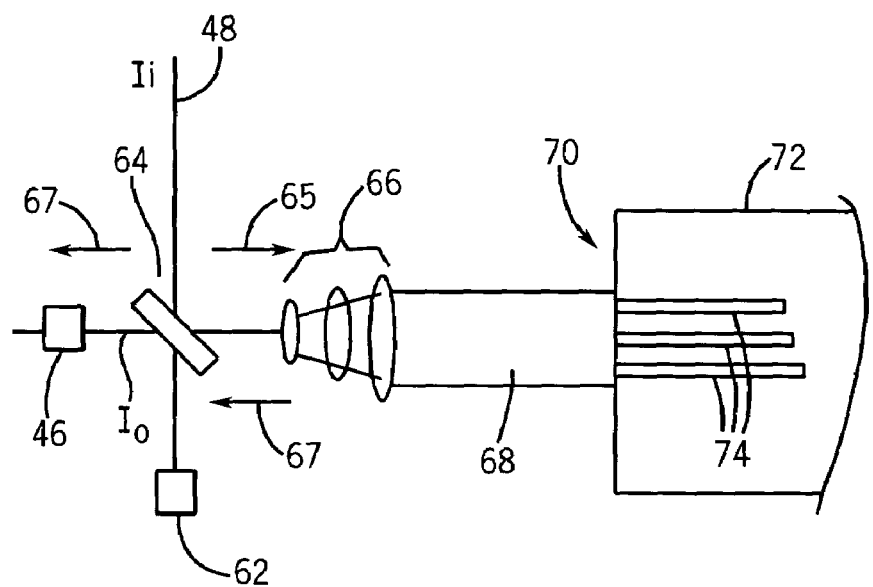
FIG. 3 is a simplified diagram of an application of the present invention to noncontact sensing in which frequency-varying light is reflected off of a number of sensor elements on a moving object.

Referring now to FIG. 3, for use in spectroscopy, before being received by the sensor 46, the coherent wavelength agile beam 48 may be directed to a beam-splitter 53 and a portion 54 directed through a transparent window 56 of a chamber 58. After passing through the chamber 58, the portion exit a second opposed transparent window 60 to be received by sensor 46. A second portion 55 of the signal 48 may be received by a second sensor 62. Signals from these two sensors 46 and 62 may be compared as the values I and $I_0$ to calculate absorption and to eliminate the effects of variations in the spectra 26 and noise in the laser 12.

The chamber 58 may be filled with a gas, liquid, or solid material and in one preferred embodiment, may be the combustion chamber of a reciprocating engine. Here, the high scan rate and sampling speed of the present invention is well suited to the dynamic environment of combusting gases. In the preferred embodiment, one thousand consecutive scans may be recorded in a twenty-microsecond time and average to produce the desired spectra.

Figure 4:
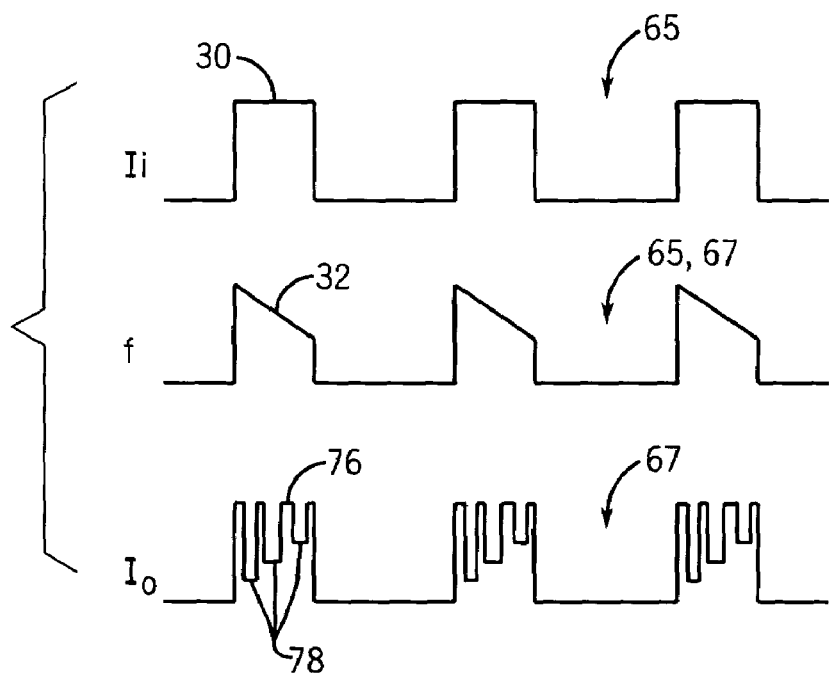
FIG. 4 is a diagram showing the frequency-varying light before and after reflection by the sensors of FIG. 3.

Referring now to FIG. 4, the high frequency scanning and broad frequency range of the present invention makes possible a frequency multiplexed reading of multiple noncontact sensors. In such an application, the beam 48 is received by a beam-splitter 64, diverting a portion 65 to beam-spreading optics 66. The beam spreading optics 66 direct a broad beam 68 to a surface 70 of an object 72 at which measurements are to be taken. The surface 70 may expose a variety of sensors 74, having a characteristic that they convert a desired measured quantity, for example, temperature, or strain, into absorption of received light from the broad beam 68. The sensors 74, for example, may be fiber-BRAGG gratings, well known for temperature and strain measurement. As mentioned above, when a fiber-BRAGG grating is expanded or compressed, its grating spectral response is changed.

In the application of FIG. 4, each of the sensors 74 exposes a cut end of a fiber-BRAGG grating to the broad beam 68 to receive the broad beam 68 into its interior. The sensors 74 are selected to each have a different absorption wavelength, and absorption wavelengths that will be non-overlapping within the expected range of the measured parameter of stress or temperature.

The surface 70 will therefore reflect the broad beam 68 with variable absorption in a number of separate bands whose precise frequency is determined by the parameters measured by the sensors 74.

The returning light 67 reflected off surface 70 will pass backwards through the optics 66 to beam-splitter 64 to be received by sensor 46. A second sensor 62 may be placed to receive beam 48 directly as it passes through beam-splitter 64 for normalization purposes, as has been described above.

Referring now to FIGS. 4 and 5, the pulses 30 of beam 65 striking surface 70 will have a varying frequency content per frequency scan 33 and a substantially constant normalized on-state intensity $I_i$. The returned light 76 will have an intensity similar to that of pulse 30 but for the absorption of particular bands 78 by the different sensors 74. Calculation of the absorption at these different frequency bands (distinguished by their time delay after the start of the pulse 76) allows simultaneous noncontacting measurement of multiple sensors 74 in a brief period of time as may be necessary if surface 70 is a moving part of a machine such as a turbine blade.

The laser 12, described above may be replaced with fiber-pigtailed, edge-emitting, super-luminescent light-emitting diodes, which may produce 40-nanometer-wide, 1-nanosecond pulses with peak powers of up to one hundred milliwatts. This embodiment will not produce coherent pulses. In an alternative embodiment, fiber optic cable 28 may be replaced by free space grating pairs, atomic vapor cells, or chirped filter-BRAGG gratings, known in the art. If necessary, fiber amplifiers can be used to boost the power of the scan wavelength output. It will be understood that the test cell may be placed between fibers 18 and 28 as an alternative embodiment.

It is specifically intended that the present invention not be limited to the embodiments and illustrations contained herein, but include modified forms of those embodiments including portions of the embodiments and combinations of elements of different embodiments as come within the scope of the following claims.

I claim:

1. A wavelength agile illumination system comprising:
   a laser producing a pulse of light of less than 1000 femtoseconds duration;
   a non-linear optical fiber receiving the pulse of light to produce a multi-frequency light pulse; and
   a frequency dependent light retarder receiving the multi-frequency light pulse to produce a light signal with time varying frequency and having a center frequency that increases monotonically over time.

2. The wavelength agile illumination system of claim 1 wherein the frequency dependent light retarder is a length of dispersion-compensating fiber optic cable.

3. The wavelength agile illumination system of claim 1 wherein the frequency dependent light retarder is a combination of at least two consecutive lengths of fiber optic cable, a first providing increased delay in lower frequencies of the light pulse and a second providing increased delay in higher frequencies of the light pulse.

4. The wavelength agile illumination system of claim 1 including a spectral filter receiving the light signal with time varying frequency to selectively pass only a range of the frequencies of the light signal with time varying frequency.

5. The wavelength agile illumination system of claim 1 including a test element receiving the light signal with time varying frequency and further including a sensor for providing amplitude measurements of the light signal with time varying frequency, after passing through the test element.

6. The wavelength agile illumination system of claim 5 wherein the test element is a chamber positioned between the frequency dependent light retarder and the sensor, the chamber receiving materials to be analyzed by selective attenuation of light of the light signal with time varying frequency.

7. The wavelength agile illumination system of claim 5 wherein the test element is a sensor element modifying frequencies of the light signal with time varying frequency according to a sensor parameter to be measured.

8. The wavelength agile illumination system of claim 1 wherein the light signal with time varying frequency includes the wavelength of 1400 nanometers and has a bandwidth of greater than 100 nanometers.

9. The wavelength agile illumination system of claim 1 wherein the light retarder is a length of fiber optic cable providing increased delay in higher frequencies of the light pulse.

10. The wavelength agile illumination system of claim 1 wherein the light retarder is a length of fiber optical cable providing increased delay in lower frequencies of the light pulse.

11. A method of producing high-rate frequency swept light signals comprising the steps of:
    (a) producing a multi-frequency pulse of light having less than a 1000 femtosecond duration wherein the light source is a narrow band laser providing a narrow frequency pulse to a non-linear optical cable; and
    (b) passing the pulse through a fiber optic cable to selectively delay certain frequencies of light to produce a light signal with time varying frequency having a center frequency that increases monotonically over time.

12. The method of claim 11 wherein the fiber optic cable is a length of dispersion-compensating fiber optic cable.

13. The method system of claim 12 wherein the fiber optic cable is a combination of at least two consecutive lengths of fiber optical cable, a first providing increased delay in lower frequencies of the light pulse and a second providing increased delay in higher frequencies of the light pulse.

14. The method of claim 11 including the step of passing the light signal with time varying frequency through a filter to selectively pass only a range of the frequencies of the light signal with time varying frequency.

15. The method of claim 11 including a test element receiving the light signal with time varying frequency and further including the step of sensing amplitude measurements of the light signal with time varying frequency after passing through the test element.

16. The method of claim 11 wherein the light signal with time varying frequency includes the wavelength of 1400 nanometers.

17. The method of claim 16 wherein the light signal with time varying frequency provides a frequency scan rate of greater than 1 nm/ns.

* * * * *